S. H. PHELPS.
STRADDLE ROW WHEELED CULTIVATOR.
APPLICATION FILED NOV. 1, 1915.
1,265,510.
Patented May 7, 1918.
5 SHEETS—SHEET 1.
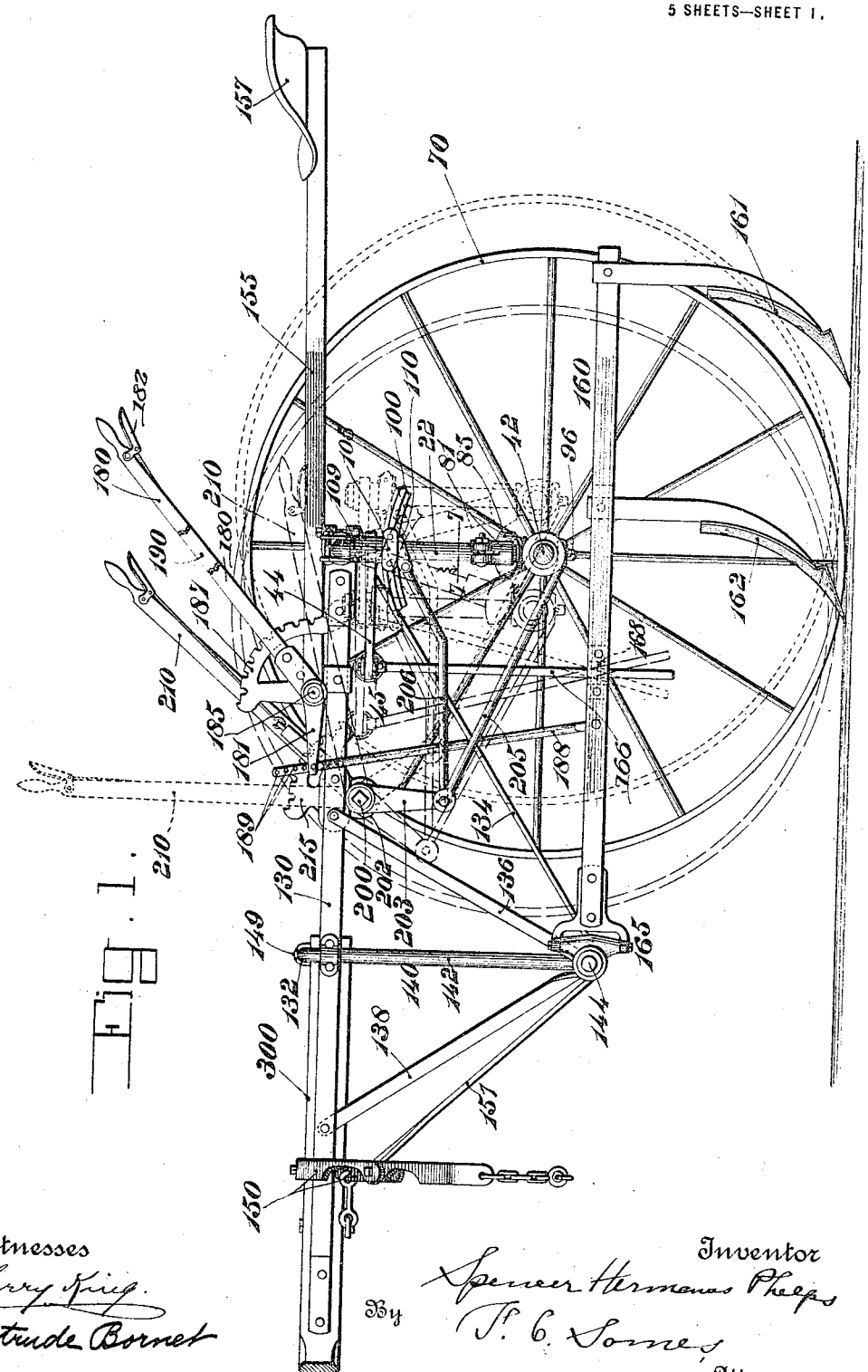

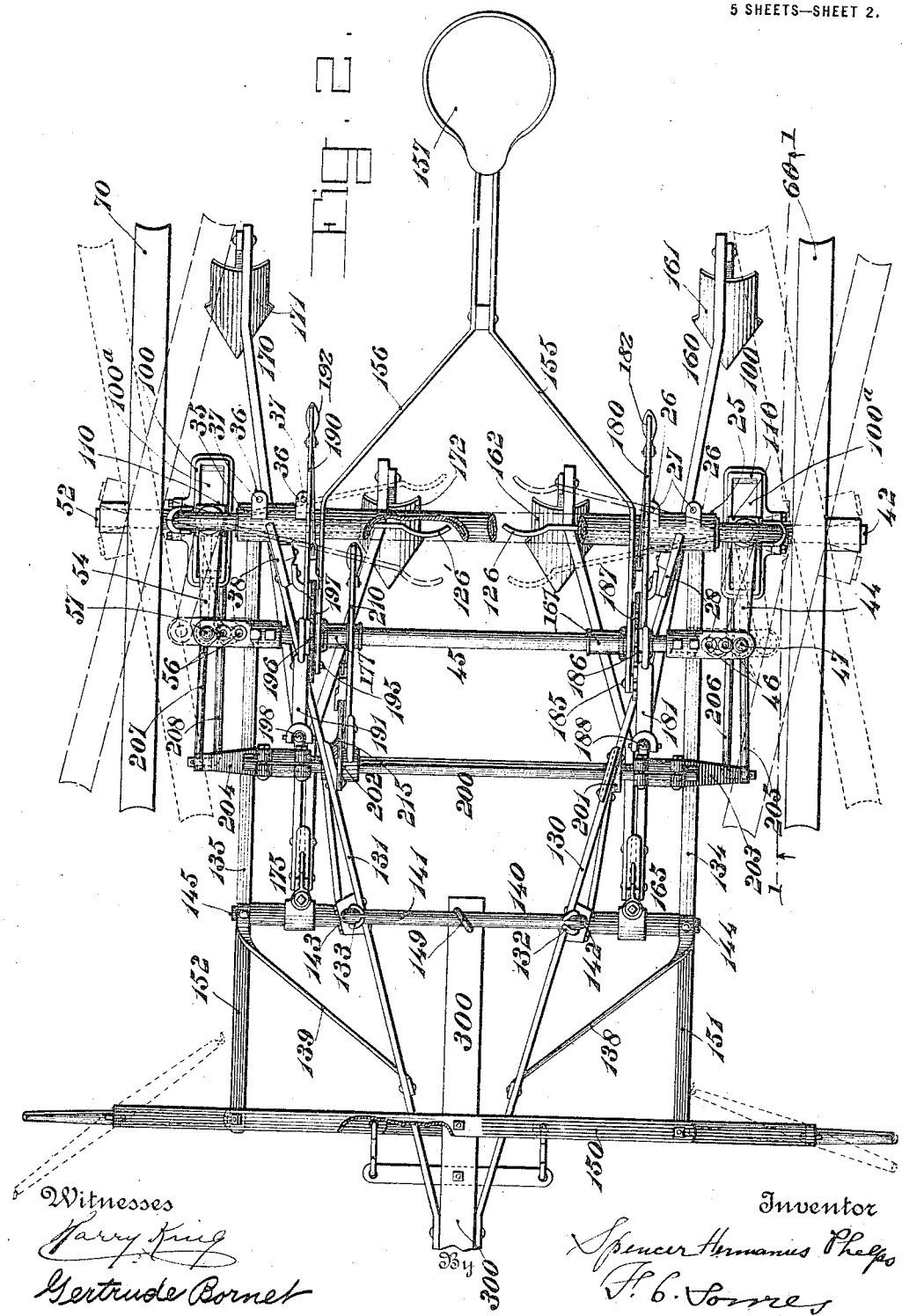

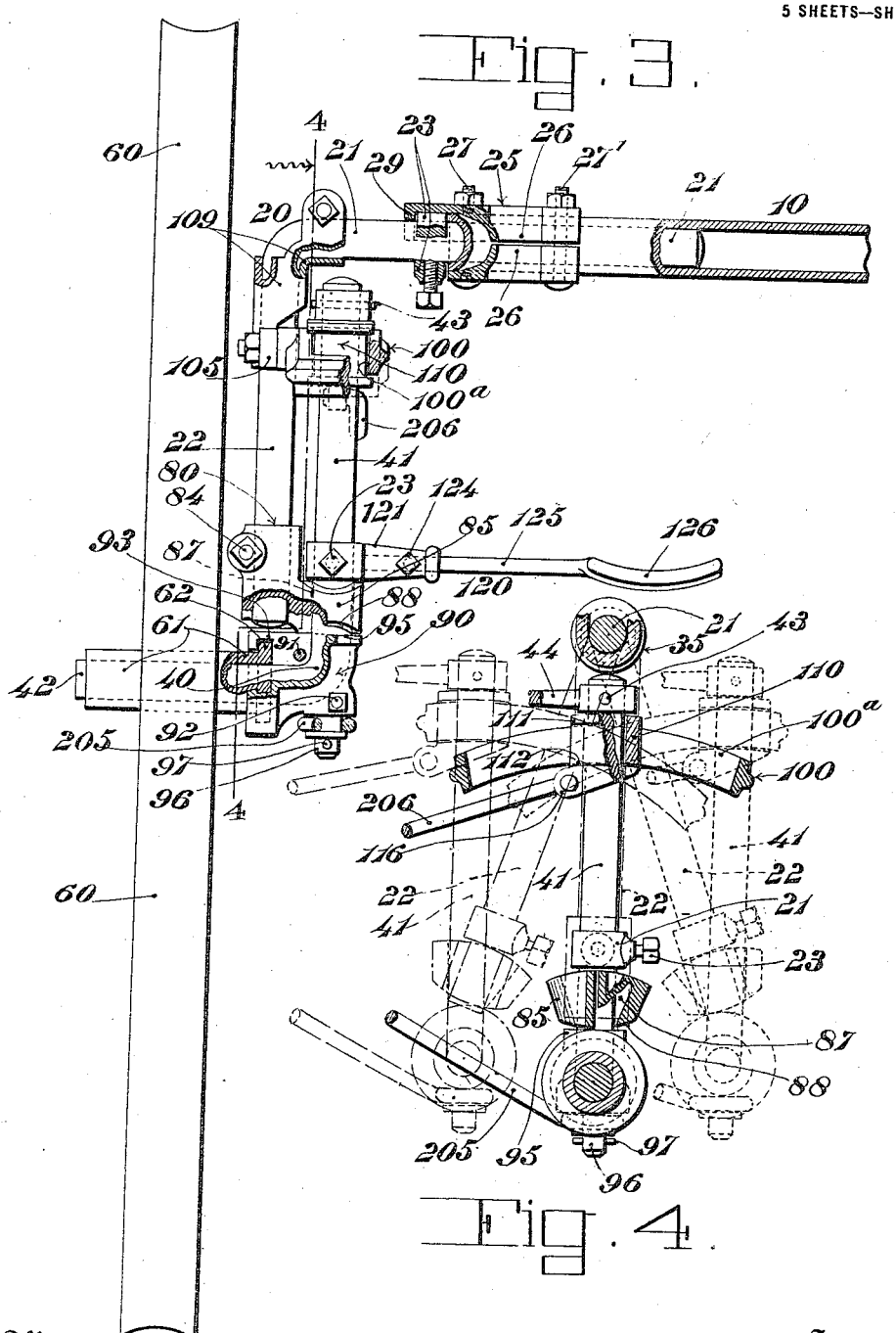

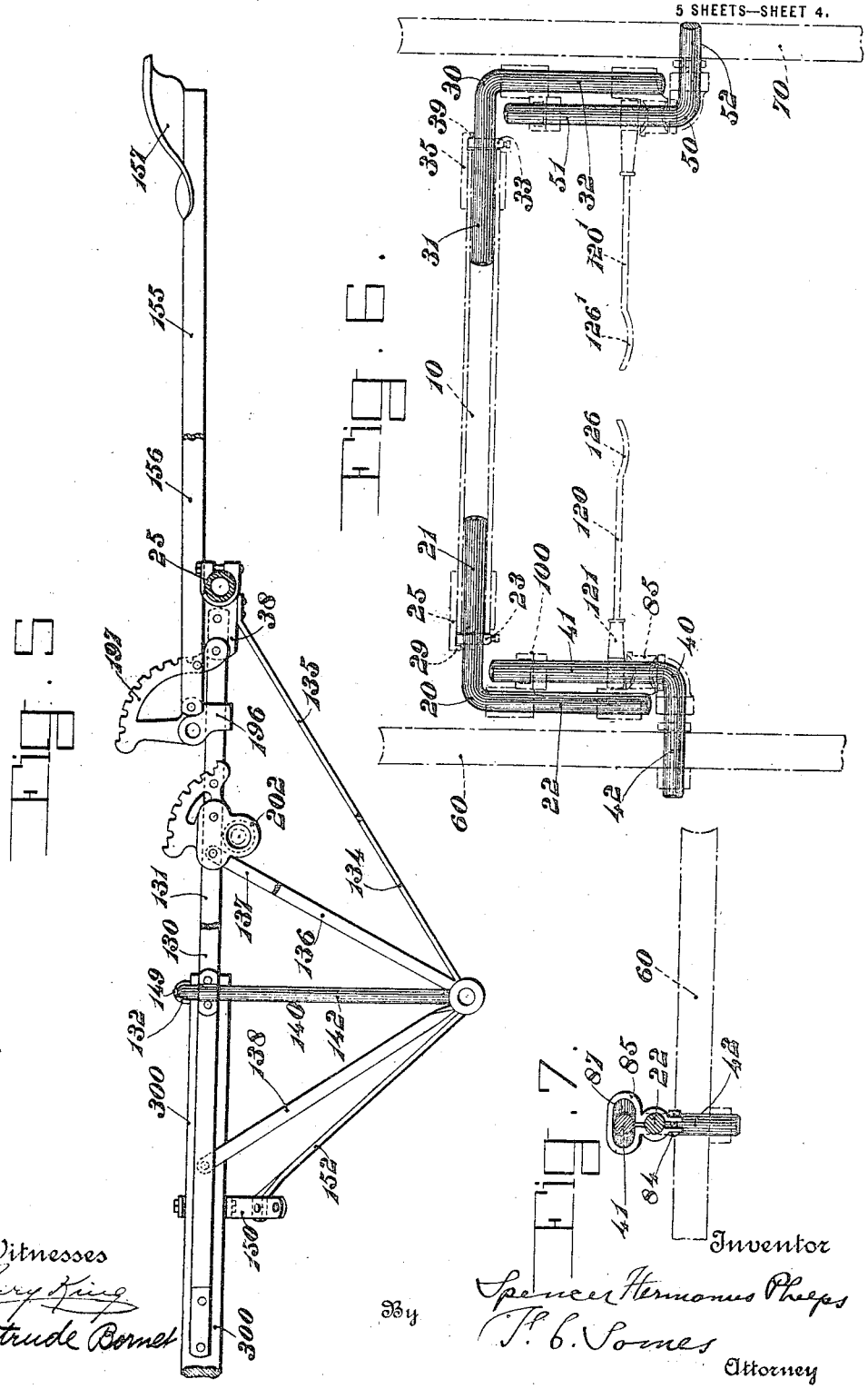

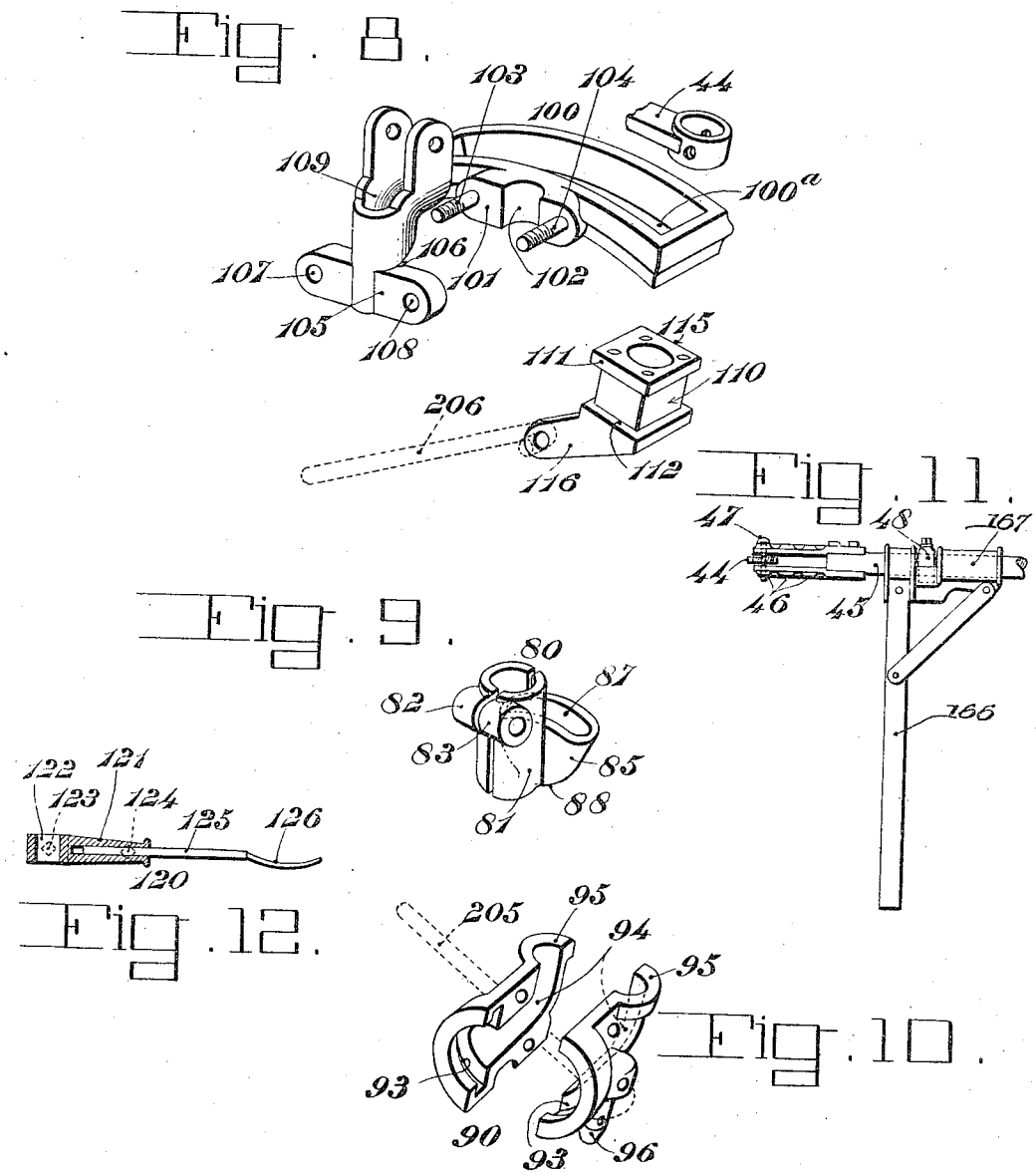

UNITED STATES PATENT OFFICE.

SPENCER HERMANUS PHELPS, OF EVANSVILLE, INDIANA, ASSIGNOR TO BLOUNT PLOW WORKS, OF EVANSVILLE, INDIANA, A CORPORATION OF INDIANA.

STRADDLE-ROW WHEELED CULTIVATOR.

1,265,510.  Specification of Letters Patent.  Patented May 7, 1918.

Application filed November 1, 1915. Serial No. 59,008.

*To all whom it may concern:*

Be it known that I, SPENCER HERMANUS PHELPS, a citizen of the United States of America, residing at Evansville, in the county of Vanderburg, in the State of Indiana, have invented certain new and useful Improvements in Straddle-Row Wheeled Cultivators, whereof the following is a specification.

This invention relates to a cultivator having elbow axles possessing a duplex adjustment for balancing and guiding the machine.

An object of the invention is to provide a balance-frame pivot-axle cultivator in which the pivotal axles are easily adjustable to different guiding angles whether they be in forward, rearward or normal position with respect to the balanced frame.

Another object of the invention is to provide a cultivator in which the pivotal elbow axles may be shifted bodily backward or forward of normal for balancing the frame without disturbing their upright arms from a constant vertical position, whereby the leverage weight strains incident to the usual backward or forward inclines of said arms are avoided.

Figure 1 of the accompanying drawings represents a side elevation, partly in section on line 1—1 of Fig. 2 of the preferred embodiment of this invention, showing various positions of the supporting elements with reference to the seat frame for balancing the latter, the full lines showing the normal position thereof, the dash lines indicating an adjustment in forward position and the dotted lines indicating an adjustment in rearward position with respect to the normal.

Fig. 2 represents a plan of the cultivator showing various positions of the elbow axles and wheels with reference to the guiding of the machine, the full lines showing said elements in straight position, the dash lines indicating a turning toward the right and the dotted lines a turning toward the left.

Fig. 3 represents on an enlarged scale with parts broken out to facilitate illustration a rear elevation of one half the arched axle or cross-beam, its elbow axle, the connecting mechanism and the supporting wheel on said elbow axle.

Fig. 4 represents on an enlarged scale a vertical transverse section of the parts shown in Fig. 3 on line 4—4 thereof, looking toward the right, the full lines showing the normal position of the elbow axle and its movable connections with reference to the supporting cross-beam or arch, the dash lines indicating the relative position which said parts assume when the elbow axle is shifted forward of its normal position and the dotted lines indicating the relative position of said parts under the rearward adjustment of the elbow axle.

Fig. 5 represents on an enlarged scale a side elevation of the rigid body or frame of the machine detached from the supporting cross-beam or arch.

Fig. 6 represents a rear elevation of the pivoted elbow end members of the axle arch and the individual elbow axles in their normal relative positions, the cross-beam connecting said end members, the couplings connecting said elbow axles with said end members, and the supporting wheels being shown in dot and dash lines.

Fig. 7 represents a horizontal section on line 7—7 of Fig. 1 showing the lower coupling between an elbow axle and its elbow arched member.

Fig. 8 represents on an enlarged scale a perspective view of the several members constituting the upper couplings for connecting an elbow axle with an elbow arched member, said members being detached to facilitate illustration thereof.

Fig. 9 represents on an enlarged scale a perspective view of a lower coupling between an elbow axle and an elbow arch member.

Fig. 10 represents on an enlarged scale a perspective view of detached sections of an elbow sleeve which engages the elbow axle at the angle thereof and serves to hold the wheel on its axle.

Fig. 11 represents a rear elevation of one half the adjustable spreadable mechanism for connecting the opposite elbow axles and the gangs at opposite sides of the cultivator.

Fig. 12 represents a side elevation of the left hand foot lever for swiveling the elbow axles to guide the cultivator toward the left, and a section of the socket for attaching said lever to the upright arm of the said elbow axle.

The same reference numbers are used in the several figures to designate the same parts, round numbers being used for the principal elements and intermediate numbers for the subordinate features thereof.

In the embodiment shown the arched axle, otherwise herein referred to as the arched cross-beam, comprises a top member 10, two dependent elbow end members 20 and 30 and two elbow axle members 40 and 50.

The top member 10 is preferably in the form of a straight tubular cross-bar composed of a pipe constructed of iron, steel or other suitable material. The elbow member 20 comprises a horizontal arm 21 and a downright arm 22 perpendicular thereto at the outer end thereof. The elbow member 30 is likewise composed of a horizontal arm 31 and a downright perpendicular arm 32. These elbow members 20 and 30 of the arched axle or cross-beam have a pivotal connection with the top bar 10 and are also adjustable longitudinally of said bar. In the form shown the horizontal arms 21 and 31 are adjustable telescopically in opposite ends of the tubular top member to extend or contract the arched axle to vary the width of the cultivator and they are also adapted to turn axially in said top member to vary the relative positions of the seat and axle to balance the cultivator. The horizontal arm 21 has a collar or other stop 23 and the horizontal arm 31 has a collar or other stop 33. These stops are preferably adjustable. Two similar split clamping sleeves 25 and 35 are disposed on opposite ends of the top member 10. The clamping sleeve 25 has a plurality of perforate ears 26 on opposite sides of its slit and bolts 27 passing through two opposite ears respectively serve to tighten or release the clamp. The clamping sleeve 35 has similar perforate ears 36 and bolts 37 serve to tighten or loosen said sleeve. These clamps are respectively provided with forward lugs 28 and 38 and with end stops 29 and 39.

The individual pivot axles 40 and 50 are right angled members or elbow axles. The elbow axle 40 consists of an upright constant vertical arm 41 and a horizontal axle spindle 42 on which the supporting wheel 60 turns. The elbow axle 50 consists of an upright constant vertical arm 51 and a horizontal axle spindle 52 on which the supporting wheel 70 turns. The upright vertical arms 41 and 51 interlap with and are respectively connected to the downright perpendicular arms 22 and 32 of the elbow members 20 and 30 of the axle arch. The connecting means between these downright and upright arms are such as to permit said downright arms to assume the vertical as shown in full lines in Figs. 1 and 4 or a forward downward incline as shown in dash lines in said figures or a backward downward incline as shown in dotted lines in said figures and to leave said upright arms always free to turn axially to permit a change of angle of the horizontal axle spindles 42 and 52 for directing the machine toward the right or left, whatever the position of the downright arms. The means shown for this duplex purpose comprise rocking connections at the lower ends of the upright and downright arms and relatively sliding connections at the upper ends thereof.

The rocking connections are preferably alike on opposite sides of the machine. The rocking connection at the left side comprises a coupling 80 fixed on the downright arm 22 and loosely engaging the upright arm 41 and an elbow sleeve 90 fixed on the elbow axle 40 at the elbow thereof. The coupling 80 is best shown in detail in Fig. 9 and consists of a split or sectional clamping sleeve 81, and a flaring loop-shaped or slotted rocker 85 integral with said sleeve. The parts of the sleeve 81 are provided at the split joint with registering bolt eyes 82 and 83 through which a bolt 84 passes and by which said sleeve is tightly held on the arm 41 as shown in Fig. 3. The loop-shaped rocker 85 is disposed at the inner side of the clamping sleeve 81 and is united therewith by an intermediate web as shown in Fig. 3. The body of the rocker has an opening or slot 87 which extends therethrough from the bottom to the top and flares or spreads upward and lengthwise of the machine. The rocker has a longitudinal convex rocker bottom 88. The elbow sleeve 90 as shown in detail in Fig. 10 is preferably composed of two sections which are clamped to the elbow axle 40 at the angle thereof by means of bolts 91 and 92. This elbow sleeve has a circular groove 93 by which it engages a flange or collar 62 of the hub 61 of the wheel 60, and an elbow bore 94 which fits the angle of the elbow axle. This sleeve 90 has at its upper side where it surrounds the upright arm 41 a horizontal flange or platform 95 and it is provided on its underside with a downward stud 96 integral with or secured to one section of said sleeve. This stud carries a cotter pin 97. The loop-shaped rocker 85 of the coupling 80 embraces the upright arm 41 of the elbow axle and rocks or oscillates on the platform 95 on the elbow sleeve 90 permitting the downright arm 22 of the axle arch to swing into inclined position while the upright arm 41 of the elbow axle remains vertical. A corresponding rocking connection is provided for the dependent elbow member 32 of the axle arch and the upright arm 51 of the elbow axle 50.

The sliding connections between the end elbow members of the axle arch and the elbow axles, which permit the swing of the former with reference to the latter, are preferably alike at each end of the arch. The sliding connection at the left side of the cultivator comprises an arc-shaped swinging guide 100 carried by the downright arm 22 and a journal box 110 slidable in said guide and engaged by the upright arm 41. Any suitable attaching means may be employed for securing the guide 100 to its supporting arm 22. As shown the guide 100 is provided on one side with an integral lug 101 having a transverse groove 102 and screw studs 103 and 104 on opposite sides of said groove. A plate 105 has a transverse groove or recess, the top of which is indicated at 106 in Fig. 8, said recess being complementary to the transverse groove or recess 102 of the lug 101 on the swinging guide 100. This plate is provided on opposite sides of said recess with holes 107 and 108 through which the screws 103 and 104 of said lug project when the parts are assembled. The parts 101 and 105 with their grooves 102 and 106 form a sleeve or clamp which surrounds the downright arm 22, being held thereon by nuts on said screw studs outside the plate 105. This sleeve is preferably provided with an elbow extension 109 which is secured to the horizontal arm 21 of the elbow member 20. The arc-shaped guide 100 fixed to the oscillatory arm 22 is concentric to and in radial relation with the rocker 80 and slides on the journal box 110 as the arm 22 swings forward or backward with relation to the vertical spindle 41. The journal box fits loosely in the rectangular slot 100ª of the arc-shaped guide and is provided at its opposite ends with lateral flanges 111 and 112 which engage the upper and lower faces of the guide 100. The top of the journal box is in the form of a detachable plate 115 which projects laterally and forms the flange 111. The bottom of the journal box 110 is provided with a forward lug 116 for connection with an adjustable mechanism hereinafter described. The upright spindle 41 of the elbow axle 40 extends through the slot of the arc-shaped guide 100, turns freely in the journal box 110 slidable therein, and projects above said box, being provided at its upper end with a cotter pin 43 for the connection hereinafter described.

The frame of the cultivator may be of any suitable construction. It is shown in Fig. 5 detached from other members of the cultivator (parts being broken out) and in Figs. 1 and 2 mounted in connection therewith. When constructed in the form shown this frame comprises two forwardly converging side bars 130 and 131 connected at their rear ends to the inclined forward lugs 28 and 38 of the clamping sleeves 25 and 35 respectively on the top member 10 of the arched axle, and at their forward ends to the draft pole 300. A verticle transverse yoke or spreader bar 140 is connected at its upper corners by clips 132 and 133 to the side bars 130 and 131 and by a clip or staple 149 to the rear end of the draft pole 300. This spreader bar is constructed of a rod bent approximately in inverted U-shape and comprises a horizontal top member 141, downright vertical members 142 and 143 integral with said top member at opposite ends thereof and horizontal lateral outward extensions 144 and 145 at the lower ends of said downright vertical members. These lateral outward extensions are provided with bolt holes at their outer ends. The spreader bar 140 is stayed by two rear stays 134 and 135 connecting its extensions 144 and 145 with the clamping sleeves 25 and 35 on the top 10 of the arched axle, two rear stays 136 and 137 connecting said extensions with the side bars 130 and 131 and two forward lateral stays 138 and 139 connecting said extensions with the converging side bars 130 and 131. A whiffle tree supporting bar 150 is connected centrally of its length to the draft pole 300 and diverges downward therefrom, being braced at its outer ends by stays 151 and 152 connecting it with the extensions 144 and 145 of the arched brace 140. Seat bars 155 and 156 are connected at their front ends to opposite sides of the frame and support a seat 157 at their outer ends.

The machine shown carries two sets 160 and 170 of gang plows. The gang 160 carries an outer rear plow 161 and an inner forward plow 162 and the gang 170 carries an inner forward plow 172 and an outer rear plow 171. These gangs may be of any ordinary or suitable construction. They have respectively connections with the wheel frame by any usual or suitable means which permit them to swing laterally and vertically. The preferred gang connection is that shown in my Patent 1,109,175 dated September 1, 1914. These connections are indicated at 165 and 175 and detailed description thereof is here unnecessary.

Any suitable means may be employed for lifting and lowering each gang. The means shown comprises a lifting lever 180 for the gang 160 and a lifting lever 190 for the gang 170. These levers are fulcrumed at opposite sides of the frame on pivot studs 185 and 195 and they are provided with forward extensions 181 and 191 in front of their pivots and with lever locks 182 and 192. Castings 186 and 196 attached to the opposite sides of the frame carry said pivot studs and also toothed segments 187 and 197 with which said lever locks engage to hold the levers respectively in the desired adjusted position. A rod 188 connects the gang 160 with the forward extension 181 of the lever 180 and a rod 198 connects the gang 170 with the forward extension 191 of the lever 190. These rods have adjustable connections with said levers by any suitable means, as for instance by shiftable pins which may engage respectively any hole of the series of holes 189 and any hole of a corresponding series of holes in the rod 198. The leverage of the lifting levers may thus be altered and the gangs raised higher or lower.

The means for adjusting the pivot axles at different angles for guiding the cultivator to the right or to the left will now be described. The pivot elbow axles 40 and 50 are provided at the upper ends of their upright vertical arms 41 and 51 with forwardly projecting arms 44 and 54 respectively, and a transverse connecting bar 45 is connected at its opposite ends to said arms 44 and 54. The connecting bar is provided at its opposite ends with means for adjusting the connection of said arms therewith to permit the change of gage of the cultivator. The means shown comprise a series of holes 46 and 56 in which the connecting pins 47 and 57 may be adjusted. These upright members 41 and 51 of the pivot elbow axles 40 and 50 are also provided with inwardly projecting lateral actuating foot levers 120 and 120′, whereby they are turned axially in their vertical bearings (comprising respectively the loop-shaped rockers as 85 and the journal boxes as 110) to swing the axle spindles 42 and 52 for guiding the machine. These foot levers are provided at their inner ends with foot rests 126 and 126′ which are in position to be engaged by the feet of the driver when sitting on the seat 157. These foot levers are preferably adjustable higher or lower on the vertical spindles 41 and 51 to suit the legs of different drivers and are also preferably extensible so that they may be adjusted to correspond with the adjustable width of the arched axle. Any suitable forms of vertical and horizontal adjustment may be employed. The foot lever 120 is shown as comprising a horizontal socket 121 and an arm 125. The socket has a vertical hole 122 through which the vertical spindle 41 is passed, said socket being vertically adjustable on said spindle by means of a set screw 123. The arm 125 is adjustable at its outer end in the bore of said socket by means of a set screw 124 thereof. Through the action of the connecting bar 45 a forward push on either actuating lever 120 or 120′ turns both the upright members 41 and 51 of the elbow axles simultaneously and turns the wheels in the same direction and swings the horizontal axle spindle 42′ rearward and the horizontal axle spindle 52 forward and inclines the wheels 60 and 70 toward the left as indicated by dotted lines in Fig. 2. A forward push on the actuating foot lever 120′ turns the upright members 41 and 51 of the pivot axles toward the right, swings the horizontal axle spindle 42 forward and the horizontal axle spindle 52 rearward and places the wheels 60 and 70 at an angle adapted to guide the machine toward the right as indicated by dash lines in Fig. 2.

The plowbeams of the gangs 160 and 170 are held at the required distance apart and made to turn conformably to the turning of the elbow axles 40 and 50 and the swing of the frame by dependent arms as 166 attached to castings 167 and 177 on the connecting bar 45. See Figs. 1 and 11 for the dependent bar 166 on the left of the machine. The corresponding bar on the right of the machine does not show in the drawings. These castings are adjustable toward and from each other on said bar by means of set collars as 48, one of which is shown in Fig. 11. These dependent arms are allowed to oscillate freely on said connecting bar 45 and the lower ends of said arms engage guides as 168 in the plowbeams of the gangs. See Fig. 1 as an example of this connection. These castings are allowed to oscillate freely on the connecting bar 45 and the lower ends thereof engage guides as 166 in the plow beams of the gangs.

The means for shifting the wheels forward or backward with reference to the seat frame and arched axle will now be described. A rock shaft 200, preferably angular in cross sections, is supported in bearings 201 and 202 secured to the side bars 130 and 131 of the frame. This shaft projects outwardly beyond said bearings and is provided at its opposite ends with crank arms 203 and 204 clamped thereto, which project downward and outward therefrom. A rod 205 connects the crank arm 203 with the stud 96 of the sleeve 90 attached to the angle of the elbow axle 40 and a rod 206 also connects said crank arm with the lug 116 on the journal box 110 on the upper end of said vertical spindle 41. A rod 207 connects the crank arm 204 with a stud corresponding to the stud 96 on a sleeve corresponding to the sleeve 90, attached to the angle of the elbow axle 50, and a rod 208 also connects said crank arm 204 with a lug corresponding to the lug 116 on a journal box corresponding to the journal box 110 on the upper end of the vertical spindle 51. A lever 210 attached to the shaft 200 has an ordinary lever latch which engages a segment 215 attached to the frame bar 131. When this lever is in the full line position of Fig. 1, the elbow axles are in normal position with reference to the arched cross-beam. When said lever is adjusted in the dotted line position, the downright elbow members of the arched cross-beam are swung rearward and the elbow axles adjusted back of normal maintaining an upright position as shown in dotted lines. When the lever 210 is thrown into the position indicated by dash lines, said downright elbow members are swung forward of normal and the elbow axles maintain an upright position as shown in dash lines Fig. 1.

In the use of this invention, the cultivator is under direct control of the driver as regards balancing, and as regards turning to the right or left with ease and without increased friction whether or not the wheels are adjusted forward or backward of normal.

I claim as my invention:

1. A cultivator comprising a frame, pivoted elbow axles connected therewith, and means for shifting said axles bodily forward or backward relatively to said frame and maintaining a vertical position thereof during such shifting.

2. A cultivator comprising a frame, a crossbar, pivoted elbow axles, and means connecting said elbow axles with said crossbar, said means permitting the shifting of said axles bodily in vertical position forward or rearward of said crossbar.

3. A cultivator comprising a frame, an arched crossbar supporting said frame, pivoted elbow axles connected with said crossbar and having axle spindles and upright arms, supporting wheels on said axle spindles, connecting means between said elbow axles and said arched crossbar which maintain the upright arms of said elbow axles in constant vertical position under normal, forward or backward adjustment of the wheels with reference to the arched crossbar, and means for effecting such adjustments.

4. A cultivator comprising a frame, an arched crossbar supporting said frame, elbow axles having constant vertical axially adjustable upright arms, supporting wheels on said axle spindles, connecting means between said elbow axles and said arched crossbar which maintain said upright arms in constant vertical position under normal, forward or backward adjustment of the wheels with reference to the arched crossbar, means for effecting such adjustments, and means for turning said upright arms to guide the cultivator to the right or to the left.

5. A cultivator comprising a frame, downright swinging arms at opposite sides thereof, elbow axles having constant vertical axially adjustable upright arms, rocking connections coupling said vertical arms with said swinging arms near the lower ends thereof and sliding connections between said arms and said uprights near their upper ends.

6. A cultivator comprising a frame carrying bearings, downright swinging arms engaging said bearings, elbow axles having axle spindles and vertical turnable arms, supporting wheels on said axle spindles, rocking connections coupling said vertical arms with said swinging arms near the lower ends thereof, sliding connections between said swinging arms and said vertical arms near the upper ends thereof, and means for adjusting said downright swinging arms on said rocking and sliding connections to shift the wheels forward or backward with reference to said frame.

7. A cultivator comprising a frame, a tubular crossbar, two elbow members having horizontal arms journaled in said tubular crossbar and endwise adjustable therein and downright arms dependent therefrom, elbow axles having axle spindles and upright turnable arms, supporting wheels on said axle spindles, rocking connections coupling said upright turnable arms, with said downright arms near the lower ends thereof, sliding connections between said upright arms and said downright arms near the upper ends thereof, and means for adjusting said elbow members to shift the supporting wheels backward or forward with reference to said frame.

8. A cultivator comprising a frame, a supporting crossbar therefor, pivoted elbow axles, supporting wheels on the axle spindles thereof, and connecting means between said elbow axles and crossbar which permit the shifting of said axles bodily in vertical position of their upright arms forward or rearward of the said crossbar.

9. A cultivator comprising a frame, a supporting crossbar therefor, pivotal elbow axles, supporting wheels on the axle spindles thereof, connecting means between said elbow axles and said crossbar which permit the shifting of said axles bodily in vertical position of their upright arms forward or rearward of said crossbeam, means for effecting such shifting, and means for turning said axles axially of their constant vertical arms.

10. A cultivator comprising a frame, a supporting crossbar therefor, dependent rocking elbow members, upright elbow axles, and connections between said elbow members and said elbow axles, which permit the former to incline forward or backward while the latter are maintained in vertical position.

11. A cultivator comprising a frame, elbow axles, supporting wheels on said axles, a combined axle shifting and turning mechanism which maintain the upright arms of said elbow axles in constant vertical position, and separate actuating devices for said mechanism.

12. A cultivator comprising a frame, dependent swinging arms at opposite sides thereof, elbow axles having constant vertical axially adjustable arms, a rocking connection between said swinging and vertical arms near the lower ends thereof, and a sliding connection between said arms near their upper ends.

13. A cultivator comprising a frame, dependent swinging arms at opposite sides thereof, elbow axles having constant vertical axially adjustable arms, a rocking connection between said swinging and vertical arms near the lower ends thereof, a sliding connection between said arms near their upper ends, a rock shaft journaled in said frame and provided with crank arms, rods connecting said crank arms with the upper ends of said vertical arms, rods connecting said crank arms with the lower ends of said vertical arms, and a lever for oscillating said rock shaft to shift said elbow axles relatively to said frame.

14. A cultivator comprising a frame, dependent swinging arms at opposite sides thereof, elbow axles having constant vertical axially adjustable arms, a rocking connection between said swinging and vertical arms near the lower ends thereof, a sliding connection between said arms near their upper ends, a rock shaft journaled in said frame and provided with crank arms, rods connecting said crank arms with the lower ends of said vertical arms, a lever for oscillating said rock shaft to shift said elbow axles relatively to said frame, and means for turning said elbow axles while in any position to which they are shifted relatively to said frame.

15. A cultivator comprising a frame, downright oscillatable arms at opposite sides thereof, arc-shaped guides attached to the upper ends of said arms, slide bearings movable in said guides, flaring slotted rockers attached to the lower ends of said arms, elbow axles engaging said rockers and bearings, rests on said elbow axles for said rockers, and means for shifting the relative positions of said downright arms and elbow axles.

16. A cultivator comprising a frame, downright oscillatable arms at opposite sides thereof, arc-shaped guides attached to the upper ends of said arms, slide bearings movable in said guides, flaring slotted rockers attached to the lower ends of said arms, elbow axles engaging said rockers and bearings, rests on said elbow axles for said rockers, means for shifting the relative positions of said downright arms and elbow axles, and means for turning said elbow axles at this point while in any position to which they are shifted.

17. A cultivator comprising a frame, downright oscillatable arms at opposite sides thereof, arc-shaped guides attached to the upper ends of said arms, slide bearings movable in said guides, flaring slotted rockers attached to the lower ends of said arms, elbow axles engaging said rockers and bearings, rests on said elbow axles for said rockers, means for shifting the relative positions of said downright arms and elbow axles, crank arms attached to said elbow axles, and a connecting rod connecting said crank arms.

18. A cultivator comprising a frame, downright oscillatable arms at opposite sides thereof, arc-shaped guides attached to the upper ends of said arms, slide bearings movable in said guides, flaring slotted rockers attached to the lower ends of said arms, elbow axles engaging said rockers and bearings, rests on said elbow axles for said rockers, means for shifting the relative positions of said downright arms and elbow axles, crank arms attached to said elbow axles, and a connecting rod having adjustable connections with said crank arms.

19. A cultivator comprising a frame having a tubular crossbar, elbow members having horizontal arms adjustable in said tubular crossbar and downright arms at the outer ends of said horizontal arms, arc-shaped guides attached to said elbow members adjacent to the angles thereof, slide bearings movable in said guides, flaring slotted rockers attached to the lower ends of said arms, elbow axles engaging said rockers and bearings, rests on said elbow axles for said rockers, and means for shifting the relative positions of said dependent arms and elbow axles.

20. A cultivator comprising a frame, downright oscillatable arms at opposite sides thereof, arc-shaped guides, slide bearings movable in said guides, clamps for securing said arc-shaped guides to said arms, elbow axles movable in said arc-shaped guides and turnable in said slide bearings, and rocking connections between the lower ends of said arms and said axles.

21. A cultivator comprising a frame, downright oscillatable arms at opposite sides thereof, arc-shaped guides attached to the upper ends of said arms, journal boxes movable in said guides and provided with lugs, elbow axles adapted to turn in said journal boxes, rocking connections between the lower ends of said arms and said axles, and adjusting mechanism connected with said lugs and with said rocking connections.

22. A cultivator comprising a frame, elbow members journaled therein, arc-shaped guides provided with elbow clamps engaging said elbow members, slide bearings movable in said guides, elbow axles movable in said arc-shaped guides and turnable in said slide bearings, and rocking connections between the lower ends of said elbow members and said axles.

23. A cultivator comprising a frame, downright oscillatable arms at opposite sides thereof, arc-shaped guides attached thereto, slide bearings movable in said guides, flaring slotted rockers attached to the lower ends of said arms, upright elbow axles movable in said rockers and arc-shaped guides and turnable in said rockers and slide bearings, and elbow sleeves secured to the angles of said elbow axles and provided with platforms on which said rockers swing.

24. A cultivator comprising a frame, downright oscillatable arms at opposite sides thereof, arc-shaped guides attached thereto, slide bearings movable in said guides, flaring slotted rockers attached to the lower ends of said arms, upright elbow axles movable in said arc-shaped guides and rockers and turnable in said rockers and slide bearings, elbow sleeves secured to the angles of said elbow axles and provided with platforms on which said rockers swing and with downward studs, a rock shaft journaled in said frame and provided with crank arms, rods connecting said crank arms with said slide bearings and said downward studs, and means for oscillating said rock shaft to shift said elbow axles relatively to said frame.

25. A cultivator comprising elbow axles, elbow sleeves disposed at the angles thereof and provided with platforms, rockers adapted to swing on said platforms, a frame, and mechanism connecting said frame with said rockers.

26. A cultivator comprising elbow axles, elbow sleeves disposed at the angles thereof, and provided with platforms and circulars grooves, supporting wheels disposed on the axle spindles of said elbow axles and having hubs engaging said grooves, rockers adapted to swing on said platform, a frame, and mechanism connecting said frame with said rockers.

SPENCER HERMANUS PHELPS.

Witnesses:
  H. J. GRIMMEISSEN,
  W. M. REYNOLDS.

Copies of this patent may be obtained for five cents each, by addressing the "Commissioner of Patents, Washington, D. C."